Patented Apr. 10, 1945

2,373,438

UNITED STATES PATENT OFFICE 2,373,438

MANUFACTURE OF 3,4-XYLIDINE

Viktor Weinmayr, Pitman, N. J., assignor to E. I.
du Pont de Nemours & Company, Wilmington,
Del., a corporation of Delaware No Drawing. Application April 21, 1942,
Serial No. 439,936

3 Claims. (Cl. 260—580)

This invention relates to preparation of 3,4-xylidine.

An object of this invention is to prepare new chemical compounds that are useful as intermediates in the preparation of dyestuffs and lactoflavin. A further object is to provide new and improved processes for preparing 3,4-xylidine. Other objects will appear hereinafter.

These objects are accomplished by the following invention. 2-methyl-5-nitrobenzyl alcohol is made by hydrolyzing 2-methyl-5-nitrobenzyl chloride. The carboxylic acid esters of 2-methyl-5-nitrobenzyl alcohol are made by reacting 2-methyl-5-nitrobenzyl chloride with a metal salt of a carboxylic acid. 2-methyl-5-aminobenzyl alcohol and its carboxylic acid esters are made by suitably reducing 2-methyl-5-nitrobenzyl alcohol and its carboxylic acid esters. 3,4-xylidine is made by fully reducing 2-methyl-5-nitrobenzyl alcohol, 2-methyl-5-aminobenzyl alcohol or one of the carboxylic acid esters of these two benzyl alcohols.

The new intermediates prepared in accordance with this invention are represented by the following formula:

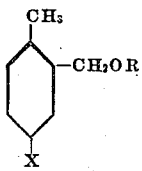

where R is hydrogen or an aliphatic or aromatic acyl group and X is a nitro or amino group. These novel intermediates are not only useful as starting materials for pure 3,4-xylidine, which is used in the synthesis of riboflavin, but are also useful in the synthesis of dyes. Claims covering these new intermediates and their manufacture have been placed in applicant's copending divisional application, Serial Number 487,977, filed May 21, 1943.

The invention is illustrated but not limited by the following examples in which the parts are given by weight.

Example I

*2-methyl-5-nitrobenzyl alcohol.*—One hundred and seven parts of anhydrous sodium carbonate and 289 parts of crystallized sodium acetate are dissolved in 1305 parts of 50% ethyl alcohol, and 290 parts of distilled 2-methyl-5-nitrobenzyl chloride (F. P. 59.6° C.) are added. The charge is maintained at a reflux temperature of about 85° C. for 20 hours. The alcohol is then removed by distillation and the charge is heated until it reaches a temperature of 105° C. The reaction product separates as an oil and solidifies to crystalline aggregates when cooled under agitation. Two hundred and fifty parts of 2-methyl-5-nitrobenzyl alcohol are isolated by filtration. This corresponds to a yield of 95.8% of theory based on 2-methyl-5-nitrobenzyl chloride. The crude product melts from 72–75° C. Pure 2-methyl-5-nitrobenzyl alcohol melting at 77° C. is obtained when the crude product is crystallized from 3 parts of benzene and 0.5 part of petroleum ether.

Example II

*2-methyl-5-nitrobenzyl acetate.*—Two hundred and fifty parts of distilled 2-methyl-5-nitrobenzyl chloride (F. P. 59.6° C.) are heated to 115–120° C. for 16 hours in a solution of 750 parts of crystallized sodium acetate in 400 parts of water. 2-methyl-5-nitrobenzyl acetate separates as an oil. It is washed with warm water to remove most of the sodium chloride and the excess of sodium acetate and then distilled under reduced pressure. Two hundred and forty parts of 2-methyl-5-nitrobenzyl acetate are obtained corresponding to a yield of 85.2% of theory. The product distills at 158–160° C. at 0.5 mm. pressure and has a freezing point of 48.8° C.

Example III

*2-methyl-5-nitrobenzyl benzoate.*—One hundred and eleven parts of distilled 2-methyl-5-nitrobenzyl chloride (F. P. 59.6° C.) are heated to the boil (106° C.) for 24 hours in a solution of 258 parts of sodium benzoate in 750 parts of water. 2-methyl-5-nitrobenzyl benzoate is formed and separates as a white crystalline product while the reaction mass is still near the reflux temperature. 160 parts of 2-methyl-5-nitrobenzyl benzoate, equal to a yield of 98.8% of theory are obtained. The product melts at 117–118° C. When crystallized from 15 parts of ethanol, it has a melting point of 118–118.5° C.

Example IV

*2-methyl-5-aminobenzyl alcohol.*—Two hundred and forty-five parts of 2-methyl-5-nitrobenzylalcohol (M. P. 77° C.), 800 parts of methanol, 25 parts of nickel catalyst and 2 parts of calcium carbonate are heated to 70–80° C. under a hydrogen pressure of 500 pounds. Reduction takes place over a period of about 4 hours. The alcoholic solution is filtered from the catalyst and evaporated to dryness. Two hundred parts of 2- methyl-5-aminobenzyl alcohol are obtained equal to a yield of 100% of theory. This crude product melts from 104–108° C. Pure 2-methyl-5-aminobenzyl alcohol melting at 111° C. is obtained when the crude product is crystallized from a mixture of benzene and toluene. The product forms white crystals, is moderately soluble in hot water, and completely soluble in dilute acids.

*Example V*

2-methyl-5-aminobenzyl alcohol. — Fifty-five and seven-tenths parts of distilled 2-methyl-5-nitrobenzyl chloride (F. P. 59.6° C.), 58.5 parts of potassium acetate, and 200 parts of methanol are heated in an autoclave to 125° C. for 4 hours. After cooling to about 50° C., 55.7 parts of anhydrous sodium sulfate and 10 parts of nickel catalyst are added. The reaction mass is heated under a pressure of 1000 pounds of hydrogen, first to 100° C. until the absorption has practically stopped and then to 150° C. for two hours under the same hydrogen pressure. The nickel catalyst is removed by filtration and the alcoholic solution is distilled. Forty parts of 2-methyl-5-aminobenzyl alcohol are obtained distilling at 140° C. under a pressure of 0.5 mm. This product melts from 105–109° C. and can be purified by crystallization to a melting point of 111° C. The yield corresponds to 97.4% of theory based on 2-methyl-5-nitrobenzyl chloride.

*Example VI*

2-methyl-5-aminobenzyl acetate.—Two hundred parts of 2-methyl-5-nitrobenzyl acetate, 350 parts of thiophene-free benzene, 120 parts of magnesium oxide, and 10 parts of nickel catalyst are heated to 70–80° C. under a pressure of 500 pounds of hydrogen until no further absorption takes place. About 2 hours are required for the reduction. The benzene solution is filtered from the catalyst and distilled. One hundred and thirty-eight parts of 2-methyl-5-aminobenzyl acetate are obtained distilling at 160–165° C. at a pressure of 0.5 mm. The product forms a yellow oil and is completely soluble in dilute acids. The yield corresponds to 80.5% of theory.

*Example VII*

3,4 - xylidine from 2 - methyl - 5 - nitrobenzyl acetate.—One hundred parts of 2-methyl-5-nitrobenzyl acetate (F. P. 48.8° C.), 500 parts of thiophene-free benzene, 20 parts of nickel catalyst and 17 parts of magnesium oxide are heated under a pressure of 500 pounds of hydrogen, first to 70–90° C. until the absorption of hydrogen has practically stopped, and then to 145–150° C. until there is no more hydrogen absorption for several hours. The time required for the reduction is about 6 hours. The benzene solution is separated from the catalyst and distilled. Forty-five parts of 3,4-xylidine are obtained, distilling from 128–130° C. at a pressure of 35 mm. This corresponds to a yield of 77.7% of theory. The distilled product has a freezing point from 47.5–48.1° C. The purity of the compound can be increased by a crystallization from gasoline. The crystallized 3,4-xylidine has a freezing point of 49.1° C. 3,4-xylidine may be obtained in a similar manner from 2-methyl-5-nitrobenzyl benzoate.

*Example VIII*

3,4-xylidine from 2-methyl-5-aminobenzyl alcohol.—Twenty-seven and four-tenths parts of 2-methyl-5-aminobenzyl alcohol (M. P. 111° C.), 21 parts of metallic sodium, and 50 parts of toluene are heated to 97–100° C. Two hundred and five parts of anhydrous isopropanol are added at such a rate that a vigorous refluxing is maintained. The reflux temperature is about 97° C. and about 2 hours are required to add the isopropanol. Refluxing is continued for about 2 hours after the addition of the isopropanol is finished. The charge is then diluted with about 500 parts of water and most of the isopropanol is removed by distillation. The 3,4-xylidine which separated is taken up in benzene, washed with cold water and distilled. Twenty-one parts of 3,4-xylidine are obtained having a freezing point of 48.1° C. The yield of 3,4-xylidine corresponds to 86.8% of theory.

*Example IX*

3,4 - xylidine from 2 - methyl - 5 - nitrobenzyl chloride.—One hundred and thirty-nine parts of distilled 2-methyl-5-nitrobenzyl chloride, 360 parts of thiophene-free benzene, and 98 parts of anhydrous potassium acetate are heated to 150° C. for two hours under a pressure of about 100 pounds of nitrogen. After cooling to 50° C., 20 parts of magnesium oxide and 40 parts of nickel catalyst are added. The charge is heated to 65–70° C. under a pressure of 800 pounds of hydrogen until no further hydrogen absorption takes place, which will be the case after about three hours. Heating is then continued under the same hydrogen pressure until a temperature of 150° C. is reached in four hours. The charge is maintained at 150° C. under a pressure of 800 pounds of hydrogen for two hours, then cooled and filtered to remove the catalyst. 3,4-xylidine having a freezing point of 48° C. is obtained in good yield upon distillation.

There are a number of variations possible without departing from the spirit of the invention.

The hydrolysis of the 2-methyl-5-nitrobenzyl chloride to 2-methyl-5-nitrobenzyl alcohol can be accomplished in the absence of sodium acetate and alcohol, using aqueous sodium carbonate alone. Other esters than the acetate or benzoate can be prepared and reduced.

Other catalysts than nickel, such as chromite catalysts or palladium can be used for the reduction of the nitro bodies. Using a nickel catalyst, a reduction temperature below 80° C. but above 40° C. is required to reduce the nitro group, using a hydrogen pressure of 400 to 1000 pounds. The reduction of the ester group to the methyl group requires temperatures above 80° C., preferably 125 to 150° C. at a pressure of 400 to 1000 pounds of hydrogen. Reduction temperatures as high as 290° C. will give satisfactory 3,4-xylidine. After the reduction has once started the hydrogen pressure should be maintained fairly constant to avoid formation of tarry by-products.

2-methyl-5-aminobenzyl alcohol can also be reduced with potassium in place of sodium. Ethanol can be used in place of isopropanol, and toluene may be left out.

It is not necessary to employ the various intermediates in their pure form or even to isolate them to obtain 3,4-xylidine. Without changing the quality of 3,4-xylidine, crude 2-methyl-5-nitrobenzyl alcohol or crude 2-methyl-5-nitrobenzyl acetate may be reduced to give 3,4-xylidine of a freezing point 47.5–48.1° C., requiring no purification other than distillation from the reaction mass. 2-methyl-5-aminobenzyl alcohol can be made from 2-methyl-5-nitrobenzyl chloride directly without isolation of 2-methyl-5-nitrobenzyl alcohol. Similarly 3,4-xylidine can be made from 2-methyl-5-nitrobenzyl chloride directly without isolating 2-methyl-5-nitrobenzyl acetate.

Isomers of 2-methyl-5-aminobenzyl alcohol are valueless for the preparation of 3,4-xylidine.

Resort may be had to such modifications and variations as fall within the spirit of the invention and the scope of the appended claims.

I claim:

1. A process of making 3,4-xylidine which comprises catalytically hydrogenating 2-methyl-5-nitrobenzyl acetate, said hydrogenation being continued until the nitro group of said compound is converted to an amino group and the

—CH₂OCO·CH₃ side chain of said compound is reduced to a methyl group.

2. A process of making 3,4-xylidine which comprises catalytically hydrogenating 2-methyl-5-nitrobenzyl benzoate, said hydrogenation being continued until the nitro group of said compound is converted to an amino group and the

—CH₂OCO·C₆H₅ side chain of said compound is reduced to a methyl group.

3. A process of making 3,4-xylidine which comprises catalytically hydrogenating a carboxylic acid ester of 2-methyl-5-nitrobenzyl alcohol, said ester having the general formula

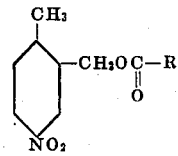

wherein R is a member of the class consisting of aliphatic and aromatic hydrocarbon groups, said hydrogenation being continued until the nitro group of said compound is converted to an amino group and the

—CH₂OC—R
       ‖
       O side chain of said compound is reduced to a methyl group.

VIKTOR WEINMAYR.